US012623444B2

(12) United States Patent
Nishio et al.

(10) Patent No.: US 12,623,444 B2
(45) **Date of Patent: *May 12, 2026**

(54) LAMINATE

(71) Applicants: DAICEL CORPORATION, Osaka (JP); DAIKIN INDUSTRIES, LTD., Osaka (JP)

(72) Inventors: Naotaka Nishio, Tokyo (JP); Takema Nakazawa, Osaka (JP); Masaya Kasai, Osaka (JP)

(73) Assignees: DAICEL CORPORATION, Osaka (JP); DAIKIN INDUSTRIES, LTD., Osaka (JP)

( * ) Notice: Subject to any disclaimer, the term of this patent is extended or adjusted under 35 U.S.C. 154(b) by 46 days.

This patent is subject to a terminal disclaimer.

(21) Appl. No.: 17/915,919

(22) PCT Filed: Mar. 23, 2021

(86) PCT No.: PCT/JP2021/011918
§ 371 (c)(1),
(2) Date: Sep. 29, 2022

(87) PCT Pub. No.: WO2021/200384
PCT Pub. Date: Oct. 7, 2021

(65) Prior Publication Data

US 2023/0143432 A1 May 11, 2023

(30) Foreign Application Priority Data

Mar. 31, 2020 (JP) ................................. 2020-061736

(51) Int. Cl.
*B32B 27/32* (2006.01)
*B32B 3/28* (2006.01)
(Continued)

(52) U.S. Cl.
CPC ................ *B32B 27/32* (2013.01); *B32B 3/28* (2013.01); *B32B 27/16* (2013.01); *C08F 220/12* (2013.01);
(Continued)

(58) Field of Classification Search
CPC .... C08F 220/12; C08F 220/36; C08F 220/68; B01D 2325/18; B01D 2325/20;
(Continued)

(56) References Cited

U.S. PATENT DOCUMENTS 9,921,010 B2 3/2018 Ootomo et al.
2015/0198390 A1 7/2015 Ootomo et al.
(Continued)

FOREIGN PATENT DOCUMENTS

EP 661502 A2 * 7/1995 ............. B01D 69/12
EP 2 026 029 A1 2/2009
(Continued)

OTHER PUBLICATIONS

Translation of KR 20110020688, Kim et al., Mar. 3, 2011. (Year: 2011).*
(Continued)

*Primary Examiner* — Hai Vo
(74) *Attorney, Agent, or Firm* — Birch, Stewart, Kolasch & Birch, LLP

(57) ABSTRACT

Provided is a laminate having low air permeability and excellent moisture permeability in a low temperature and low humidity environment. The laminate is provided with a porous substrate and a moisture-permeable membrane disposed on one side of the porous substrate, the laminate having an air resistance of 3000 seconds/100 cc or greater based on the Gurley method according to JIS P8117-2009 and a first moisture permeability of 300 g/($m^2$·24 h) or greater based on a moisture permeability testing method (the
(Continued)

cup method) according to JIS Z0208-1976 under the conditions of a temperature of 5° C., a relative humidity of 45%, and a wind speed of 0.2 m/s or less.

2 Claims, 2 Drawing Sheets

(51) Int. Cl.

| | |
|---|---|
| ***B32B 27/16*** | (2006.01) |
| ***C08F 220/12*** | (2006.01) |
| ***C08F 220/36*** | (2006.01) |
| ***C08F 220/68*** | (2006.01) |
| ***C09D 133/06*** | (2006.01) |
| ***C09D 133/14*** | (2006.01) |
| ***F24F 12/00*** | (2006.01) |
| ***F28D 9/00*** | (2006.01) |
| ***F28D 21/00*** | (2006.01) |
| ***F28F 3/08*** | (2006.01) |
| ***F28F 21/06*** | (2006.01) |

(52) U.S. Cl.

CPC .......... *C08F 220/36* (2013.01); *C08F 220/68* (2013.01); *C09D 133/062* (2013.01); *C09D 133/14* (2013.01); *F24F 12/006* (2013.01); *F28D 9/0062* (2013.01); *F28D 21/0014* (2013.01); *F28D 21/0015* (2013.01); *F28F 3/08* (2013.01); *F28F 21/065* (2013.01); *B32B 2255/10* (2013.01); *B32B 2255/26* (2013.01); *B32B 2307/724* (2013.01)

(58) Field of Classification Search

CPC ........ B01D 69/02; B01D 71/40; B01D 71/76; B01D 71/82; B01D 2325/36; B01D 2325/38; B01D 71/58; C08J 2323/10; C08J 2433/08; C08J 7/0427; C08J 7/056; C08J 7/123; C08J 2323/02; C08J 2433/10; C08J 2433/14; C08J 9/365; Y02B 30/56; B32B 2255/10; B32B 2255/26; B32B 2307/724; B32B 27/16; B32B 27/32; B32B 3/28; C09D 133/062; C09D 133/14; F24F 12/006; F28D 21/0014; F28D 21/0015; F28D 9/0062; F28F 21/065; F28F 2245/02; F28F 2245/04; F28F 3/08

See application file for complete search history.

(56) References Cited

U.S. PATENT DOCUMENTS

| | | | | |
|---|---|---|---|---|
| 2017/0204211 | A1* | 7/2017 | Millichamp .............. | C08F 2/48 |
| 2021/0164737 | A1 | 6/2021 | Nishioka et al. | |

FOREIGN PATENT DOCUMENTS

| | | | | |
|---|---|---|---|---|
| EP | 2 409 757 | A1 | | 1/2012 |
| JP | 5-69503 | A | | 3/1993 |
| JP | 9-156007 | A | | 6/1997 |
| JP | 2012025820 | A | * | 2/2012 |
| JP | 2014-55683 | A | | 3/2014 |
| JP | 2017-185475 | A | | 10/2017 |
| KR | 10-2011-0020688 | A | | 3/2011 |
| KR | 20110020688 | A | * | 3/2011 |
| WO | WO 2019/111793 | A1 | | 6/2019 |

OTHER PUBLICATIONS

Translation of JP2012025820-A, Chino et al., Feb. 9, 2012. (Year: 2012).*

International Search Report for International Application No. PCT/JP2021/011918, dated May 25, 2021, with an English translation.

Japanese Office Action for Japanese Application No. 2020-061736, dated May 24, 2022.

Written Opinion of the International Searching Authority for International Application No. PCT/JP2021/011918, dated May 25, 2021, with an English translation.

Extended European Search Report issued Mar. 20, 2024, in European Patent Application No. 21780454.1.

Office Action issued Mar. 22, 2024, in Chinese Patent Application No. 202180025874.0.

* cited by examiner

LAMINATE

TECHNICAL FIELD

The present disclosure relates to a laminate. More specifically, the present disclosure relates to a laminate provided with a porous substrate and a moisture-permeable membrane disposed on at least one side of the porous substrate. The present application claims priority from the Japanese Patent Application No. 2020-061736 filed in Japan on Mar. 31, 2020, the content of which is incorporated herein by reference.

BACKGROUND ART

Heat exchange ventilation devices that exchange heat between supply air and exhaust air during ventilation are known as devices capable of ventilating without impairing the effects of cooling and heating.

Heat exchange sheets for performing heat exchange are used in heat exchange ventilation devices. As a partition member that physically separates supply air and exhaust air, a heat exchange sheet is required to have a low air permeability (gas barrier property), for preventing supply air and exhaust air from mixing with each other, and heat transfer property, for exchanging heat between supply air and exhaust air. In addition, a heat exchange sheet (total heat exchange sheet) used in a total heat exchanger, which exchanges temperature (sensible heat) and moisture (latent heat) between supply air and exhaust air, is further required to have a high moisture permeability.

A heat exchange sheet adopting a moisture-permeable membrane formed of, for example, calcium chloride or lithium chloride which have deliquescency, or a low molecular weight compound such as sulfuric acid or sodium hydroxide can be considered as an example of a heat exchange sheet used in a total heat exchanger. Among them, a moisture-permeable membrane formed of calcium chloride or lithium chloride is widely used from the perspective of safety. However, a moisture-permeable membrane formed of a compound having deliquescency or a low molecular weight compound is highly soluble in water and has poor water resistance.

Another known heat exchange sheet used in a total heat exchanger is a partition member for total heat exchange sheet having a porous substrate and a hydrophilic polymer compound provided on the surface and the inner part of the porous substrate, the hydrophilic polymer compound being a polymer of a compound having a quaternary ammonium group and an amide group (see Patent Document 1).

CITATION LIST

Patent Document

Patent Document 1: JP 2014-55683 A

SUMMARY OF INVENTION

Technical Problem

However, the hydrophilic polymer compound using a polymer of a compound having a quaternary ammonium group and an amide group described in Patent Document 1 has insufficient moisture permeability. In particular, the moisture permeability in a low temperature and low humidity environment is insufficient.

Accordingly, an object of the present disclosure is to provide a laminate having low air permeability and excellent moisture permeability.

Solution to Problem

As a result of diligent studies to achieve the above object, the inventors of the present disclosure found that a laminate provided with a porous substrate and a moisture-permeable membrane that is disposed on one side of the porous substrate, the laminate having an air resistance equal to or higher than a specific value and a moisture permeability under specific conditions equal to or higher than a specific value, has low air permeability and excellent moisture permeability. The present invention relates to what has been completed based on these findings.

The present disclosure provides a laminate provided with a porous substrate and a moisture-permeable membrane disposed on one side of the porous substrate, the laminate having an air resistance of 3000 seconds/100 cc or greater based on the Gurley method according to JIS P8117-2009, and a first moisture permeability of 300 $g/(m^2 \cdot 24\ h)$ or greater based on a moisture permeability testing method (the cup method) according to JIS Z0208-1976 under the conditions of a temperature of 5° C., a relative humidity of 45%, and a wind speed of 0.2 m/s or less.

Regarding the laminate, with respect to the above first moisture permeability and a second moisture permeability, the second moisture permeability being based on a moisture permeability testing method (a cup method) according to JIS Z0208-1976 under conditions of a temperature of 20° C., a relative humidity of 65%, and a wind speed of 0.2 m/s or less, it is preferable that both $a \geq 154$ and $b \geq -170$ are satisfied, where a linear function obtained by connecting two points of the first moisture permeability and the second moisture permeability is expressed by an equation of $y=ax+b$ on a graph in which x is a volume absolute humidity and y is a moisture permeability under the measurement conditions of the moisture permeabilities.

Advantageous Effects of Invention

The laminate of the present disclosure has low air permeability and excellent moisture permeability. The laminate of the present disclosure also has excellent moisture permeability in a low temperature and low humidity environment. As such, the laminate of the present disclosure can be particularly preferably used as a total heat exchange sheet.

DESCRIPTION OF EMBODIMENTS

The laminate according to an embodiment of the present disclosure is provided with at least a porous substrate and a moisture-permeable membrane disposed on at least one side of the porous substrate. The moisture-permeable membrane may be disposed on one side of the porous substrate, or may be disposed on both sides of the porous substrate. Furthermore, the laminate may have a structure in which the moisture-permeable membrane is sandwiched between two of the porous substrates. That is, the porous substrate may be disposed on both sides of the moisture-permeable membrane. In this case, the two of the porous substrates may be the same porous substrate, or may be porous substrates having different material, thickness, or the like.

Figure 1:
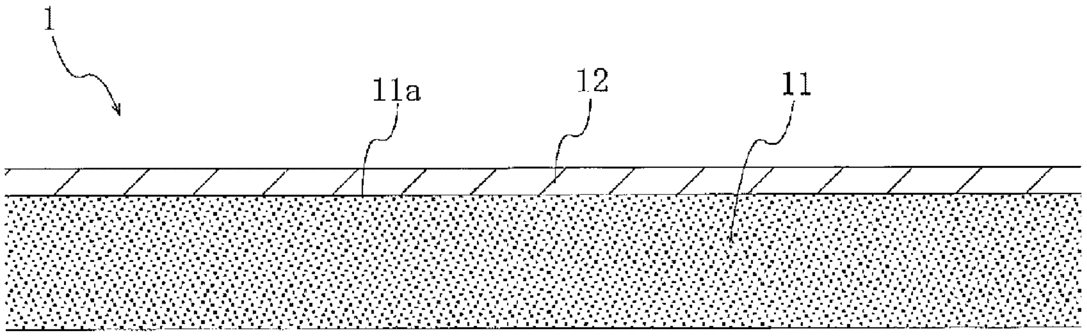
FIG. 1 is a schematic cross-sectional view illustrating a laminate of an embodiment of the present disclosure.

FIG. 1 is a schematic cross-sectional view illustrating a laminate of an embodiment of the present disclosure. A laminate 1 is provided with a porous substrate 11 and a moisture-permeable membrane 12 disposed on one side 11*a* of the porous substrate 11.

The laminate has an air resistance based on the Gurley method according to JIS P8117-2009 of 3000 seconds/100 cc or greater, preferably 4000 seconds/100 cc or greater, and more preferably 5000 seconds/100 cc or greater. The air resistance of the laminate is 3000 seconds/100 cc or greater; as such, the laminate has a low air permeability. An upper limit of the air resistance is not limited, but may be, for example, 150000 seconds/100 cc, 100000 seconds/100 cc, or 80000 seconds/100 cc.

The laminate has a moisture permeability (sometimes referred to as "first moisture permeability") based on a moisture permeability testing method (the cup method) according to JIS Z0208-1976 under the conditions of a temperature of 5° C., a relative humidity of 45%, and a wind speed of 0.2 m/s or less of 300 $g/(m^2 \cdot 24\ h)$ or greater, preferably 400 $g/(m^2 \cdot 24\ h)$ or greater, and more preferably 500 $g/(m^2 \cdot 24\ h)$ or greater. The moisture permeability of the laminate is 300 $g/(m^2 \cdot 24\ h)$ or greater; as such, the laminate has an excellent moisture permeability (in particular, moisture permeability in a low temperature and low humidity environment). An upper limit of the first moisture permeability is not limited, but may be, for example, 5000 $g/(m^2 \cdot 24\ h)$, 2000 $g/(m^2 \cdot 24\ h)$, or 1000 $g/(m^2 \cdot 24\ h)$.

The moisture-permeable membrane is preferably formed of a resin. The resin preferably has a hydrophilic group from the viewpoint of excellent moisture permeability. In particular, from the viewpoint of excellent hydrophilicity, the hydrophilic group preferably has a cationic group and an anionic group, and more preferably a phosphorylcholine group.

Furthermore, the resin preferably has a hydrophobic group from the viewpoint of excellent water resistance as well. The hydrophobic group is preferably a hydrocarbon group having 2 or more carbons. Examples of the hydrocarbon group having 2 or more carbons include those exemplified and described as $R^6$ in a constituent unit represented by Formula (2) described later.

The resin forming the moisture-permeable membrane is particularly preferably a copolymer containing a constituent unit represented by Formula (1) below and a constituent unit represented by Formula (2) below:

[Chem. 1]

(1)

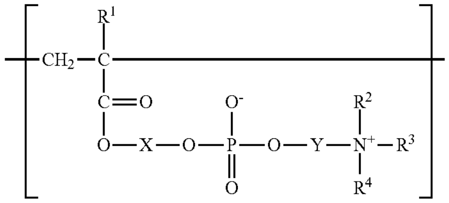

where in Formula (1), $R^1$ represents a hydrogen atom or an alkyl group having from 1 to 4 carbons; $R^2$, $R^3$, and $R^4$ are the same or different and each represent an alkyl group having from 1 to 4 carbons; X represents a divalent hydrocarbon group having from 1 to 4 carbons; Y represents a divalent linear hydrocarbon group having from 1 to 4 carbons.

[Chem. 2]

(2)

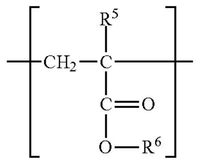

where in Formula (2), $R^5$ represents a hydrogen atom or an alkyl group having from 1 to 4 carbons, and $R^6$ represents a hydrocarbon group having 2 or more carbons.

In Formula (1), $R^1$ represents a hydrogen atom or an alkyl group having from 1 to 4 carbons, preferably a hydrogen atom or a methyl group, more preferably a methyl group.

In Formula (1), $R^2$, $R^3$, and $R^4$ are the same or different and each represent an alkyl group having from 1 to 4 carbons. Examples of the alkyl group having from 1 to 4 carbons include a methyl group, an ethyl group, a propyl group, a butyl group, and a t-butyl group. Among these, a methyl group is preferred.

In Formula (1), X represents a divalent hydrocarbon group having from 1 to 4 carbons, and examples thereof include an alkylene group, an alkenylene group, and an alkynylene group. Examples of the alkylene group include a linear or branched $C_{1-4}$ alkylene group, such as a methylene group, a dimethylene group, a trimethylene group, an isopropylene group, and a tetramethylene group. Examples of the alkenylene group include a linear or branched $C_{2-4}$ alkenylene group, such as an ethynylene group, a 1-propenylene group, an isopropenylene group, a 1-butenylene group, a 2-butenylene group, and a 3-butenylene group. Among these, the divalent hydrocarbon group is preferably a linear or branched alkylene group, more preferably a linear alkylene group.

In Formula (1), Y represents a divalent linear hydrocarbon group having from 1 to 4 carbons, and examples thereof include an alkylene group, an alkenylene group, and an alkynylene group. Examples of the alkylene group include a methylene group, a dimethylene group, a trimethylene group, and a tetramethylene group. Examples of the alkenylene group include an ethynylene group, a 1-propenylene group, and a 1-butenylene group. Among these, the divalent linear hydrocarbon group is preferably an alkylene group, and more preferably a dimethylene group.

Examples of a monomer forming the constituent unit represented by Formula (1) above include 2-methacryloyloxyethyl phosphorylcholine.

In Formula (2), $R^5$ represents a hydrogen atom or an alkyl group having from 1 to 4 carbons, preferably a hydrogen atom or a methyl group, and more preferably a methyl group.

In Formula (2), $R^6$ represents a hydrocarbon group having 2 or more carbons. From the viewpoint of a more appropriate hydrophobicity of the hydrophobic portion, the number of carbons is preferably from 4 to 26, more preferably from 8 to 22, even more preferably from 10 to 20, and particularly preferably from 14 to 18.

Examples of the hydrocarbon group having 2 or more carbons include an aliphatic hydrocarbon group, an alicyclic hydrocarbon group, an aromatic hydrocarbon group, and a group in which two or more of those listed above are bonded.

Examples of the aliphatic hydrocarbon group include an alkyl group, an alkenyl group, and an alkynyl group. Examples of the alkyl group include a linear or branched alkyl group, such as an ethyl group, a propyl group, an isopropyl group, a butyl group, a hexyl group, an octyl group, an isooctyl group, a decyl group, a dodecyl group, and a stearyl group. Examples of the alkenyl group include a linear or branched alkenyl group, such as a vinyl group, an allyl group, a methallyl group, a 1-propenyl group, an isopropenyl group, a 1-butenyl group, a 2-butenyl group, a 3-butenyl group, a 1-pentenyl group, a 2-pentenyl group, a 3-pentenyl group, a 4-pentenyl group, and a 5-hexenyl group. Examples of the alkynyl group include a linear or branched alkynyl group, such as an ethynyl group and a propynyl group.

Examples of the alicyclic hydrocarbon group include: a $C_{3-12}$ cycloalkyl group, such as a cyclopropyl group, a cyclobutyl group, a cyclopentyl group, a cyclohexyl group, and a cyclododecyl group; a $C_{3-12}$ cycloalkenyl group, such as a cyclohexenyl group; and a $C_{4-15}$ crosslinked cyclic hydrocarbon group, such as a bicycloheptanyl group and a bicycloheptenyl group.

Examples of the aromatic hydrocarbon group include a $C_{6-14}$ aryl group, such as a phenyl group and a naphthyl group (especially, a $C_{6-10}$ aryl group).

Among these, the hydrocarbon group having 2 or more carbons is preferably an aliphatic hydrocarbon group, more preferably a linear or branched alkyl group, and further preferably a linear alkyl group.

Examples of the monomer forming the constituent unit represented by Formula (2) above include stearyl (meth) acrylate.

Only one type of each of the constituent unit represented by Formula (1) above and the constituent unit represented by Formula (2) above may be contained, or two or more types of each of the constituent unit represented by Formula (1) above and the constituent unit represented by Formula (2) above may be contained.

A molar ratio of the constituent unit represented by Formula (1) above to the constituent unit represented by Formula (2) above (the former/the latter) is not limited, but is preferably from 1/100 to 100/1 (that is, from 0.01 to 100.0), more preferably from 0.01 to 90, even more preferably from 0.02 to 80, further preferably from 0.1 to 20, and particularly preferably from 0.5 to 5.

A molar ratio of the hydrophilic portion to the hydrophobic portion (the former/the latter) in the copolymer is preferably from 0.01 to 2.0, more preferably from 0.01 to 1.5, and even more preferably from 0.01 to 1.3. Note that, regarding the hydrophilic portion and the hydrophobic portion, when a negative integral value is an attraction value relative to water while a positive integral value is a repulsive value relative to water in an energy histogram of a combination of a solute and a solvent obtained from a process of calculating free energy based on energy representation, the term indicated as the attraction value is referred to as the hydrophilic portion while the term indicated as the repulsive value is referred to as the hydrophobic portion.

In the copolymer described above, the polymerized forms of the constituent unit represented by Formula (1) above and the constituent unit represented by Formula (2) above are not limited, and may be any of block copolymerization, alternating copolymerization, and random copolymerization. When the copolymer is a copolymer of the monomer forming the constituent unit represented by Formula (1) above and the monomer forming the constituent unit represented by Formula (2) above, the copolymer may be any of a block copolymer, an alternating copolymer, or a random copolymer. Among these, the copolymer is preferably a random copolymer.

The copolymer may have a constituent unit derived from another monomer in addition to the constituent unit represented by Formula (1) above and the constituent unit represented by Formula (2) above. However, in the copolymer, the total number of moles of the constituent unit represented by Formula (1) above and the constituent unit represented by Formula (2) above is preferably 50 mol % or greater, more preferably 90 mol % or greater, and even more preferably 99 mol % or greater, relative to the total number of moles of constituent units derived from all the monomers constituting the copolymer.

A weight average molecular weight of the copolymer is not limited, but is preferably from 20000 to 2000000, more preferably from 30000 to 1500000, even more preferably from 50000 to 1200000, and particularly preferably from 70000 to 500000. The weight average molecular weight is a value measured by gel permeation chromatography (GPC) and calibrated with polystyrene standards.

By containing the constituent unit represented by Formula (1) above, the copolymer has an amphoteric and extremely hydrophilic group, and has a hydrophilic portion. Furthermore, by containing the constituent unit represented by Formula (2) above, the copolymer has an alkyl ester moiety having 2 or more carbons, which is a hydrophobic portion. In addition, when the molar ratio of the constituent unit represented by Formula (1) above to the constituent unit represented by Formula (2) above is within the range described above, the hydrophilic portion and the hydrophobic portion in the copolymer are present in a well-balanced manner. In this case, it is inferred that a structure in which the hydrophilic part and the hydrophobic part are phase-separated is formed in the moisture-permeable membrane formed of the copolymer, and that the hydrophilic portion can function as a water guide path to allow more water vapor to pass through, resulting in excellent moisture permeability.

Further, in general, a moisture-permeable membrane formed of calcium chloride or potassium chloride tends to have an extremely low moisture absorption amount and inferior moisture permeability in a low temperature and low humidity environment; however, regarding the moisture-permeable membrane formed of the copolymer described above, the moisture absorption amount does not become extremely low while the moisture permeability is excellent even in a low temperature and low humidity environment. In addition, regarding the hydrophilic portion and the hydrophobic portion, when the proportion of the hydrophobic portion in the molar ratio is increased, it is also possible to obtain a moisture-permeable membrane that has excellent moisture permeability, is difficult to dissolve in water, and has excellent water resistance. Furthermore, since the pH of the aqueous solution of the copolymer described above is weakly acidic, it is less likely to cause corrosion of metal (that is, excellent metal corrosion resistance) as compared to a moisture-permeable membrane using a conventional strongly acidic resin having an acidic functional group such as a sulfonyl group.

The moisture-permeable membrane formed of the resin may include another component in addition to the resin within a range that does not impair the effects of the laminate.

A thickness of the moisture-permeable membrane is not limited, but is preferably from 50 to 1000 nm, and more preferably from 100 to 500 nm. When the thickness is 50 nm or greater, the membrane-forming property becomes good, leading to improved gas barrier property. When the thickness is 1000 nm or less, the moisture permeability becomes better. Further, it is easy to form a thin membrane of the moisture-permeable membrane of 1000 nm or less, and cost efficiency is excellent.

As an element that serves as a support of the moisture-permeable membrane, the porous substrate preferably has excellent moisture permeability.

A material that forms the porous substrate may be either a hydrophilic material or a hydrophobic material, but is preferably a hydrophobic material. In a case in which the hydrophobic material is used, when an aqueous composition for forming moisture-permeable membrane is being applied, the aqueous composition does not penetrate into the porous substrate, and as such, it becomes unnecessary to have a lead substrate for preventing the aqueous composition from flowing down from the side opposite to the coating film-formed side of the porous substrate.

Examples of the material that forms the porous substrate include a polyolefin-based resin, a cellulose-based resin, a polycarbonate resin, a polyamide resin, a polyimide resin, a polyamide-imide resin, a fluorine-based resin, an inorganic substance such as metal and glass, and paper. Among these, a polyolefin-based resin is preferable since the moisture-permeable membrane can be formed on the porous substrate at a relatively low temperature and from the viewpoint of excellent moisture permeability and water resistance. The material may be in the form of fibers such as metal fibers and inorganic fibers. The material that forms the porous substrate may be only one type or two or more types.

Examples of the porous substrate include a resin porous membrane, an inorganic porous film, a metal porous membrane, and a fibrous substrate.

The polyolefin-based resin is a polymer (including an olefin-based elastomer) composed of an olefin as an essential monomer component, that is, a polymer containing at least a constituent unit derived from an olefin in a molecule (in one molecule). The olefin is not limited, and examples thereof include an α-olefin such as ethylene, propylene, 1-butene, and 4-methyl-1-pentene.

Examples of the polyolefin-based resin include a polymer composed of ethylene as an essential monomer component (polyethylene-based resin), a polymer composed of propylene as an essential monomer component (polypropylene-based resin), an ionomer, and an amorphous cyclic olefin-based polymer. Among these, a polypropylene-based resin is preferable.

A porosity of the porous substrate is not limited, but is preferably from 30 to 90 vol %, and more preferably from 40 to 70 vol %. When the porosity is 30 vol % or greater, moisture permeability improves. When the porosity is 90 vol % or less, the support performance of the moisture-permeable membrane improves.

A thickness of the porous substrate is not limited, but is preferably 5 μm or greater, and more preferably 10 μm or greater, from the viewpoint of allowing the moisture-permeable membrane to be sufficiently supported. In addition, the thickness of the porous substrate is preferably 50 μm or less, and more preferably 30 μm or less, taking into account the viewpoint of excellent moisture permeability and/or cost efficiency.

The surface of a side of the porous substrate (for example, the side 11*a* illustrated in FIG. 1) on which the moisture-permeable membrane is provided preferably has been subjected to a hydrophilization treatment, from the viewpoint of making it possible to easily form the moisture-permeable membrane. In particular, when a hydrophobic material is used as the material that forms the porous substrate, it is preferable that the hydrophilization treatment is performed. Examples of the hydrophilization treatment include corona discharge treatment and plasma treatment. These hydrophilization treatments allow a carboxy group, a hydroxy group, or a carbonyl group to be generated at a porous substrate surface; as such, the aqueous composition for forming moisture-permeable membrane easily wets the porous substrate surface and spreads on the porous substrate surface, making it easy to form the moisture-permeable membrane. Also, this improves adhesion between the porous substrate and the moisture-permeable membrane. In addition, when the porous substrate formed of a hydrophobic substrate is stored as a roll, the roll is in a form in which one side and the other side of the porous substrate are in contact with each other; since the one side having hydrophilicity and the other side having hydrophobicity are in contact with each other, blocking can be prevented.

A surface tension of the surface of a side of the porous substrate on which the moisture-permeable membrane is formed is preferably from 35 to 55 dyn/cm, and more preferably from 37 to 50 dyn/cm. When the surface tension is 35 dyn/cm or greater, it becomes easy to apply the aqueous composition for forming moisture-permeable membrane, and the formation of the moisture-permeable membrane becomes easy. When the surface tension is 55 dyn/cm or less, the aqueous composition for forming moisture-permeable membrane does not wet and spread too much, and the moisture-permeable membrane can be easily formed on a porous substrate surface. Note that in a case in which a surface of the porous substrate has been subjected to a hydrophilization treatment, the surface of the side on which the moisture-permeable membrane is formed is the surface that has undergone the hydrophilization treatment.

A surface tension of the inner part of the porous substrate (that is, a region of the porous substrate in which the moisture-permeable membrane is not formed) is preferably less than 35 dyn/cm, and more preferably 33 dyn/cm or less. When the surface tension is less than 35 dyn/cm, the aqueous composition for forming moisture-permeable membrane is suppressed from penetrating into the inner part of the porous substrate, and the moisture-permeable membrane can be easily formed on a porous substrate surface. Note that in a case in which a surface of the porous substrate has been subjected to a hydrophilization treatment, the inner part of the porous substrate is a region that has not undergone a hydrophilization treatment. Furthermore, the surface tension of the inner part can be obtained by measuring a cross-section obtained by cutting the porous substrate.

The laminate preferably has a moisture permeability (sometimes referred to as "second moisture permeability") based on a moisture permeability testing method (the cup method) according to JIS Z0208-1976 under the conditions of a temperature of 20° C., a relative humidity of 65%, and a wind speed of 0.2 m/s or less of 1600 g/($m^2$·24 h) or greater, more preferably 1700 g/($m^2$·24 h) or greater, and even more preferably 1800 g/($m^2$·24 h) or greater. The laminate has excellent moisture permeability, and thus it is possible to have a configuration in which the moisture permeability is 1600 g/($m^2$·24 h) or greater.

Regarding the laminate described above, with respect to the first moisture permeability and the second moisture permeability, it is preferable that both a≥154 and b≥−170 are satisfied, where a linear function, which is a straight line, obtained by connecting two points of the first moisture permeability and the second moisture permeability is expressed by the equation of y=ax+b in a graph in which x is a volume absolute humidity and y is a moisture permeability under the measurement conditions of moisture permeability. Note that the volume absolute humidity x of the first moisture permeability is approximately 3.1 g/$m^3$, and the volume absolute humidity x of the second moisture permeability is approximately 11.2 g/$m^3$.

In the above equation, a is 154 or greater, preferably 155 or greater, more preferably 160 or greater, and even more preferably 180 or greater. The higher the absolute humidity, the higher the vapor pressure, and as such, in general, the higher the absolute humidity, the higher the moisture permeability. Therefore, the laminate is capable of achieving the relationship of a≥154, which is difficult for a conventional laminate provided with a moisture-permeable membrane to achieve, and the moisture permeability of the laminate is particularly excellent in this case.

In the above equation, b is −170 or greater, preferably −150 or greater, more preferably −130 or greater, and even more preferably −110 or greater. When b satisfies the relationship of b≥−170, the moisture permeability in a low temperature and low humidity environment is particularly excellent. Further, when a satisfies the relationship of a≥154 while b satisfies the relationship of b≥−170, the moisture permeability is excellent in a wide range of environments, including a low temperature low humidity environment and a room temperature environment.

The laminate preferably has a rate of decrease in air resistance according to the following water resistance test of 50% or less, more preferably 20% or less, and even more preferably 15% or less. When the rate of decrease in air resistance is 50% or less, water resistance is excellent. In addition, in a case in which the rate of decrease in air resistance is within the range described above while the molar ratio of the hydrophobic portion in the copolymer is high, water resistance is even better.

Water Resistance Test

A test piece of φ7 cm is cut out from the laminate, and the air resistance is measured (initial air resistance). Thereafter, the test piece is immersed in 1 L of room temperature water for 15 minutes, and then naturally dried at room temperature. The immersion and drying counts as one cycle, and the cycle is repeated 50 times on the test piece, resulting in a test piece after water resistance test. Then, the air resistance of the obtained test piece after water resistance test (air resistance after water resistance test) is measured. Then, the rate of decrease in air resistance is determined in accordance with the following formula. Note that both the initial air resistance and the air resistance after water resistance test are an air resistance based on the Gurley method according to JIS P8117-2009.

Rate of decrease in air resistance (%)=[(initial air resistance)−(air resistance after water resistance test)]/(initial air resistance)×100

The laminate preferably has an air resistance after water resistance test based on the Gurley method according to JIS P8117-2009 of 3000 seconds/100 cc or greater, more preferably 4000 seconds/100 cc or greater, and even more preferably 5000 seconds/100 cc or greater. The laminate has an excellent water resistance and an excellent moisture permeability, and thus it is possible to have a configuration in which the air resistance after water resistance test is 3000 seconds/100 cc or greater.

The laminate can be produced by forming the moisture-permeable film on the surface of at least one side of the porous substrate by a known or commonly-used method. For example, the moisture-permeable membrane may be formed directly on the surface of one side of the porous substrate, or the moisture-permeable membrane may be temporarily formed on another support, and then transferred to (bonded with) the surface of one side of the porous substrate to form the moisture-permeable membrane on the porous substrate. Of which, the former method is preferable from the viewpoint of excellent adhesion between the moisture-permeable membrane and the porous substrate.

The surface of a side of the porous substrate on which the moisture-permeable membrane is provided may be subjected to a hydrophilic treatment. Examples of the hydrophilic treatment include those described above.

The moisture-permeable membrane can be formed by applying (coating) a composition for forming the moisture-permeable membrane on the porous substrate or on the other support, and removing solvent from the obtained coating film by heating or the like.

The composition can be produced by a known or commonly used method. For example, when the laminate has a moisture-permeable membrane formed of the copolymer, the composition can be produced by dissolving or dispersing the copolymer in a solvent and, as needed, mixing an additive such as a preservative. The solvent is preferably water and/or a water-soluble solvent. When water or a water-soluble solvent is used, it is inferred that the copolymer is dispersed in the composition in a core-shell shape in which the inner side is a hydrophobic portion while the outer side is a hydrophilic portion. By using such a composition, when the coating film is dried, the hydrophilic part and the hydrophobic part are phase-separated to form a moisture-permeable film having a water guide path, and it is inferred that the hydrophobic parts are firmly bonded to each other, leading to better water resistance.

Examples of the water-soluble solvent include: an aliphatic water-soluble alcohol, such as methanol, ethanol, n-propanol, and i-propanol; and a glycol ether, such as ethylene glycol monomethyl ether, ethylene glycol monobutyl ether, propylene glycol monomethyl ether, and propylene glycol monoethyl ether. One of the water-soluble solvents listed above may be used, or two or more thereof may be used.

A proportion (concentration) of the copolymer in the composition in which the copolymer is dissolved or dispersed is not limited, but is preferably from 0.5 to 5 mass %, more preferably from 1 to 4 mass %, and even more preferably from 1.5 to 3 mass %. When the concentration is 5 mass % or less, the thickness of the coating layer increases, and thus the film thickness of the moisture-permeable membrane after drying is more uniform. This makes it possible to form a moisture-permeable membrane that is thinner while having an excellent gas barrier property, and consequently, the moisture permeability is further improved. Furthermore, when the concentration is within the above range, it is easy to form a moisture-permeable membrane having excellent coatability as well as excellent moisture permeability and gas barrier property.

Note that a known coating method may be used for the application (coating) of the composition. For example, a coater such as a gravure roll coater, a reverse roll coater, a kiss roll coater, a dip roll coater, a bar coater, a knife coater, a spray coater, a comma coater, or a direct coater may be used.

The heating temperature when removing solvent from the coating film is preferably from 35 to 90° C., more preferably from 40 to 85° C., and even more preferably from 45 to 80° C. The heating time may be a suitable time employed as appropriate, but is, for example, from 5 seconds to 20 minutes, preferably from 5 seconds to 10 minutes, and more preferably from 10 seconds to 5 minutes. Since a moisture-permeable membrane can be formed at a low temperature of 90° C. or less (in particular, 80° C. or less) using the composition, film formation is easy, and a polyolefin-based resin having excellent moisture permeability can be used as the porous substrate.

The laminate has a low air permeability and an excellent moisture permeability. Furthermore, the laminate has an excellent moisture permeability and water resistance in a low temperature and low humidity environment. As such, the laminate can be preferably used in a product that requires such a function, such as a total heat exchange device, an undergarment, a disposable water-repellent/moisture-permeable material, and an application for dehydration without exposure to air or bacteria (a filter for storing aged meat, etc.). The laminate for total heat exchanger device is, for example, a sheet capable of exchanging temperature (sensible heat) and moisture (latent heat) between supply air and exhaust air.

By changing the shape of the laminate into a corrugated shape as needed and further performing lamination, the laminate can be turned into a total heat exchange device (total heat exchange sheet). The total heat exchanger device may be either a cross-flow type or a counter-flow type. A total heat exchange device using the laminate described above has a low air permeability, an excellent moisture permeability (in particular, moisture permeability in a low temperature and low humidity environment), and an excellent water resistance. The total heat exchanger device can be used as a total heat exchange device of an air conditioner. The air conditioner uses a total heat exchange device having a low air permeability, an excellent moisture permeability, as well as an excellent moisture permeability in a low temperature and low humidity environment, and an excellent water resistance; as such, the air conditioner has an excellent indoor heat retention, an excellent indoor moisture retention, and an excellent durability even in a low temperature and low humidity environment.

Each aspect disclosed in the present specification can be combined with any other feature disclosed herein. Note that each of the configurations, combinations thereof, or the like in each of the embodiments are examples, and additions, omissions, replacements, and other changes to the configurations may be made as appropriate without departing from the spirit of the present disclosure. In addition, each aspect of the invention according to the present disclosure is not limited by the embodiments or the following examples but is limited only by the claims.

EXAMPLES

An embodiment of the present invention will be described in further detail below based on examples.

Example 1

A random copolymer of 2-methacryloyloxyethyl phosphorylcholine and stearyl methacrylate [ratio of constituent units (former/latter): 1/1, concentration: 4 mass %, weight average molecular weight: 100000) was diluted with distilled water, resulting in a composition of 2 mass %. Meanwhile, the surface of one side of a porous substrate made of a polyolefin-based resin (thickness: 20 μm, porosity: 48 vol %, surface tension: 32 dyn) was subjected to a corona treatment, resulting in a hydrophilic surface having a surface tension of 46 dyn. Then, the hydrophilic surface of the porous substrate was coated with the composition described above using an applicator, and heating was performed at 50° C. for 3 minutes, resulting in a moisture-permeable membrane (thickness: from 100 to 500 nm). In this way, the laminate of Example 1 was produced.

Example 2

The laminate of Example 2 was produced in the same manner as in Example 1 except that a porous substrate made of a polyolefin-based resin (thickness: 12 μm, porosity: 40 vol %, surface tension: 32 dyn) was used as the porous substrate.

Example 3

The laminate of Example 3 was produced in the same manner as in Example 1 except that a porous substrate made of a polyolefin-based resin (thickness: 25 μm, porosity: 56 vol %, surface tension: 32 dyn) was used as the porous substrate.

Comparative Example 1

A total heat exchange sheet contained in a commercially available total heat exchanger was retrieved and used as the laminate of Comparative Example 1. Note that the laminate had paper (thickness: 30 μm) as the porous substrate, and the porous substrate had been soaked in an inorganic salt having deliquescency as a moisture permeability improving component.

Evaluation

Each of the laminates obtained in Examples and Comparative Examples was evaluated as follows. The evaluation results are listed in a table. Note that the symbol "-" in the table indicates that evaluation was not performed.

(1) Air Resistance

The air resistance of the laminates obtained in Examples and Comparative Examples was measured based on the Gurley method according to JIS P8117-2009. Specifically, a 5 cm×5 cm test piece was cut out from the laminates obtained in Examples and Comparative Examples and placed in a Gurley device, and the number of seconds needed to pass 100 cc of air was measured with a stopwatch.

(2) Moisture Permeability

Figure 2:
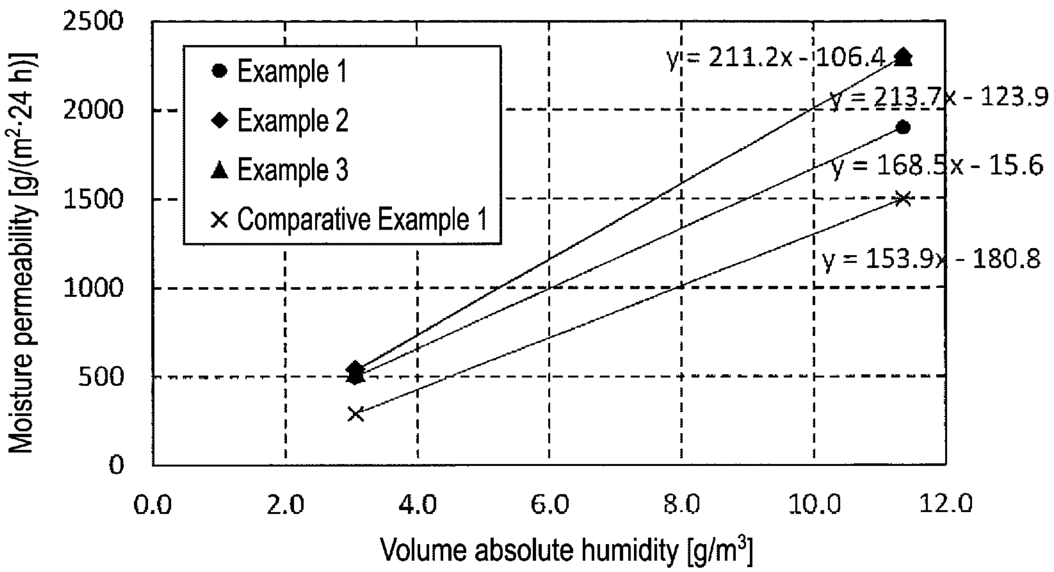
FIG. 2 is a linear function graph obtained by plotting a volume absolute humidity on the x-axis and a moisture permeability on the y-axis regarding a moisture permeability of the laminate obtained in Examples and Comparative Examples.

The moisture permeability of the laminates obtained in Examples and Comparative Examples was measured based on the moisture permeability testing method (the cup method) according to JIS Z0208-1976. Specifically, 30 g of calcium chloride was placed in a moisture permeable cup; the laminates obtained in Examples and Comparative Examples were left in a measurement environment for two hours or more, and then used as a moisture permeable sheet to cover the moisture permeable cup to achieve airtightness. Then, the increase in the total mass of calcium chloride and the moisture permeable cup in an environment with substantially no wind (a wind speed of 0.2 m/s or less) after 1 hour was converted into a mass per 1 $m^2$·24 hours of the test piece and measured as the moisture permeability. Note that a first moisture permeability was measured in an environment of a temperature of 5° C. and a relative humidity of 45%, while a second moisture permeability was measured in an environment of a temperature of 20° C. and a relative humidity of 65%. The obtained first moisture permeability and second moisture permeability were plotted with volume absolute mass (g/$m^3$) on the x-axis and moisture permeability [g/($m^2$·24 h)] on the y-axis to create a linear function graph. The created graph is shown in FIG. 2.

TABLE 1

| | Air resistance [sec/100 cc] | First moisture permeability [g/($m^2$ · 24 h)] | Second moisture permeability [g/($m^2$ · 24 h)] | a | b |
|---|---|---|---|---|---|
| Example 1 | 10000 and more | 500 | 1900 | 168.5 | −15.6 |
| Example 2 | 7000 | 540 | 2300 | 211.2 | −106.4 |
| Example 3 | 7000 | 530 | 2300 | 213.7 | −123.9 |
| Comparative Example 1 | 3000 | 290 | 1500 | 153.9 | −180.8 |

As presented by the table, the laminates of Examples were evaluated to have high air resistance, meaning low air permeability, and excellent moisture permeability (Examples 1 to 3). In particular, the moisture permeability of the laminates of Examples in an environment with a temperature of 5° C., a relative humidity of 45%, and substantially no wind was 500 g/($m^2$·24 h) or greater, and the laminates of Examples were evaluated to have excellent moisture permeability in a low temperature and low humidity environment. Meanwhile, the laminate of Comparative Example 1 was evaluated to have also poor moisture permeability.

Hereinafter, variations of the invention according to the present disclosure will be described.

[Appendix 1] A laminate provided with a porous substrate and a moisture-permeable membrane disposed on one side of the porous substrate, the laminate having an air resistance of 3000 seconds/100 cc or greater based on the Gurley method according to JIS P8117-2009, and a first moisture permeability of 300 g/($m^2$·24 h) or greater based on a moisture permeability testing method (the cup method) according to JIS Z0208-1976 under the conditions of a temperature of 5° C., a relative humidity of 45%, and a wind speed of 0.2 m/s or less.

[Appendix 2] The laminate according to Appendix 1, wherein the air resistance based on the Gurley method according to JIS P8117-2009 is 4000 seconds/100 cc or greater, preferably 5000 seconds/100 cc or greater).

[Appendix 3] The laminate according to Appendix 1 or 2, wherein the air resistance based on the Gurley method according to JIS P8117-2009 is 150000 seconds/100 cc or less (preferably 100000 seconds/100 cc or less, and more preferably 80000 seconds/100 cc or less).

[Appendix 4] The laminate according to any one of Appendices 1 to 3, wherein the first moisture permeability based on a moisture permeability testing method (the cup method) according to JIS Z0208-1976 under the conditions of a temperature of 5° C., a relative humidity of 45%, and a wind speed of 0.2 m/s or less is 300 g/($m^2$·24 h) or greater [preferably 400 g/($m^2$·24 h) or greater, and more preferably 500 g/($m^2$·24 h) or greater].

[Appendix 5] The laminate according to any one of Appendices 1 to 4, wherein the first moisture permeability based on a moisture permeability testing method (the cup method) according to JIS Z0208-1976 under the conditions of a temperature of 5° C., a relative humidity of 45%, and a wind speed of 0.2 m/s or less is 5000 g/($m^2$·24 h) or less [preferably 2000 g/($m^2$·24 h) or less, and more preferably 1000 g/($m^2$·24 h) or less].

[Appendix 6] The laminate according to any one of Appendices 1 to 5, wherein a second moisture permeability based on a moisture permeability testing method (the cup method) according to JIS Z0208-1976 under the conditions of a temperature of 20° C., a relative humidity of 65%, and a wind speed of 0.2 m/s or less is 1600 g/($m^2$·24 h) or greater [preferably 1700 g/($m^2$·24 h) or greater, and more preferably 1800 g/($m^2$·24 h) or greater].

[Appendix 7] The laminate according to any one of Appendices 1 to 6, wherein with respect to the first moisture permeability and a second moisture permeability, the second moisture permeability being based on a moisture permeability testing method (a cup method) according to JIS Z0208-1976 under conditions of a temperature of 20° C., a relative humidity of 65%, and a wind speed of 0.2 m/s or less, both $a \geq 154$ and $b \geq -170$ are satisfied, where a linear function obtained by connecting two points of the first moisture permeability and the second moisture permeability is expressed by an equation of $y=ax+b$ on a graph in which x is a volume absolute humidity and y is a moisture permeability under the measurement conditions of the moisture permeabilities.

[Appendix 8] The laminate according to Appendix 7, wherein a in the equation is 155 or greater (preferably 160 or greater, more preferably 180 or greater).

[Appendix 9] The laminate according to Appendix 7 or 8, wherein b in the equation is −150 or greater (preferably −130 or greater, more preferably −110 or greater).

[Appendix 10] The laminate according to any one of Appendices 1 to 9, wherein the moisture-permeable membrane is formed of a resin.

[Appendix 11] The laminate according to Appendix 10, wherein the resin has a hydrophilic group (preferably a cationic group and an anionic group, and more preferably a phosphorylcholine group).

[Appendix 12] The laminate according to Appendix 10 or 11, wherein the resin has a hydrophobic group [preferably a hydrocarbon group having 2 or more carbons, and more preferably $R^6$ in a constituent unit represented by Formula (2)].

[Appendix 13] The laminate according to any one of Appendices 10 to 12, wherein the resin contains a copolymer containing a constituent unit represented by Formula (1) below and a constituent unit represented by Formula (2) below:

[Chem. 1]

(1)

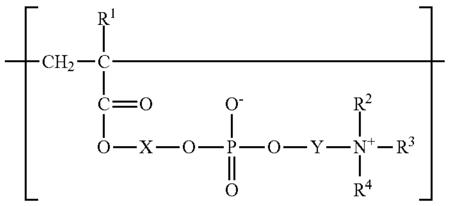

where in Formula (1), $R^1$ represents a hydrogen atom or an alkyl group having from 1 to 4 carbons; $R^2$, $R^3$, and $R^4$ are the same or different and each represent an alkyl group having from 1 to 4 carbons; X represents a divalent hydrocarbon group having from 1 to 4 carbons; Y represents a divalent linear hydrocarbon group having from 1 to 4 carbons, and

[Chem. 2]

(2)

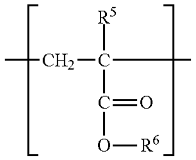

where in Formula (2), $R^5$ represents a hydrogen atom or an alkyl group having from 1 to 4 carbons, and $R^6$ represents a hydrocarbon group having 2 or more carbons.

[Appendix 14] The laminate according to Appendix 13, wherein in Formula (1) above, R' is a hydrogen atom or a methyl group (preferably a methyl group).

[Appendix 15] The laminate according to Appendix 13 or 14, wherein in Formula (1) above, $R^2$, $R^3$, and $R^4$ are a methyl group.

[Appendix 16] The laminate according to any one of Appendices 13 to 15, wherein X in Formula (1) above is a linear or branched alkylene group having from 1 to 4 carbons (preferably a linear alkylene group having from 1 to 4 carbons).

[Appendix 17] The laminate according to any one of Appendices 13 to 16, wherein Y in Formula (1) above is an alkylene group having from 1 to 4 carbons (preferably a dimethylene group).

[Appendix 18] The laminate according to any one of Appendices 13 to 17, wherein a monomer forming the constituent unit represented by Formula (1) is 2-methacryloyloxyethyl phosphorylcholine.

[Appendix 19] The laminate according to any one of Appendices 13 to 18, wherein in Formula (2) above, $R^5$ is a hydrogen atom or a methyl group (preferably a methyl group).

[Appendix 20] The laminate according to any one of Appendices 13 to 19, wherein in Formula (2) above, $R^6$ is a hydrocarbon group (preferably an aliphatic hydrocarbon group, more preferably a linear or branched alkyl group, and even more preferably a linear alkyl group) having from 4 to 26 (preferably from 8 to 22, more preferably from 10 to 20, and even more preferably from 14 to 18) carbons.

[Appendix 21] The laminate according to any one of Appendices 13 to 20, wherein a monomer forming the constituent unit represented by Formula (2) above is stearyl (meth)acrylate.

[Appendix 22] The laminate according to any one of Appendices 13 to 21, wherein a molar ratio of the constituent unit represented by Formula (1) above to the constituent unit represented by Formula (2) above (the former/the latter) is from 1/100 to 100/1 (preferably from 0.01 to 90, more preferably from 0.02 to 80, even more preferably from 0.1 to 20, and particularly preferably from 0.5 to 5).

[Appendix 23] The laminate according to any one of Appendices 13 to 22, wherein a total number of moles of the constituent unit represented by Formula (1) above and the constituent unit represented by Formula (2) above is 50 mol % or greater (preferably 90 mol % or greater, and more preferably 99 mol % or greater) relative to a total number of moles of constituent units derived from all the monomers constituting the copolymer.

[Appendix 24] The laminate according to any one of Appendices 13 to 23, wherein the copolymer has a weight average molecular weight from 20000 to 2000000 (preferably from 30000 to 1500000, more preferably from 50000 to 1000000, and even more preferably from 70000 to 500000).

[Appendix 25] The laminate according to any one of Appendices 13 to 24, wherein the copolymer is a random copolymer of the monomer forming the constituent unit represented by Formula (1) above and the monomer forming the constituent unit represented by Formula (2) above.

[Appendix 26] The laminate according to any one of Appendices 1 to 25, wherein a material that forms the porous substrate is a hydrophobic material (preferably a polyolefin-based resin, and more preferably a polypropylene-based resin).

[Appendix 27] The laminate according to any one of Appendices 1 to 26, wherein the porous substrate has a porosity from 30 to 90 vol % (preferably from 40 to 70 vol %).

[Appendix 28] The laminate according to any one of Appendices 1 to 27, wherein the surface of the porous substrate side on which the moisture-permeable membrane is provided has been subjected to a hydrophilization treatment.

[Appendix 29] The laminate according to any one of Appendices 1 to 28, wherein the surface of the porous substrate side on which the moisture-permeable membrane is formed has a surface tension from 35 to 55 dyn/cm (preferably from 37 to 50 dyn/cm).

[Appendix 30] The laminate according to any one of Appendices 1 to 29, wherein an inner part of the porous substrate, which is a region in which the moisture-permeable membrane is not formed, has a surface tension of less than 35 dyn/cm (preferably 33 dyn/cm or less).

[Appendix 31] The laminate according to any one of Appendices 1 to 30, wherein a rate of decrease in air resistance according to the following water resistance test is 50% or less (preferably 20% or less, and more preferably 15% or less):

Water Resistance Test

A test piece of φ7 cm is cut out from the laminate, and the initial air resistance is measured. Thereafter, the test piece is immersed in room temperature water for 15 minutes, and then naturally dried at room temperature. The immersion and drying counts as one cycle, and the cycle is repeated 50 times on the test piece, resulting in a test piece after water resistance test. Then, the air resistance after water resistance test of the obtained test piece after water resistance test is measured. Then, the rate of decrease in air resistance is determined in accordance with the following formula. Note that both the initial air resistance above and the air resistance after the water resistance test above are an air resistance based on the Gurley method according to JIS P8117-2009.

Rate of decrease in air resistance (%)=[(initial air resistance)−(air resistance after water resistance test)]/(initial air resistance)×100

[Appendix 32] The laminate according to any one of Appendices 1 to 31, wherein an air resistance after the following water resistance test based on the Gurley method according to JIS P8117-2009 is 3000 seconds/100 cc or greater (preferably 4000 seconds/100 cc or greater, and more preferably 5000 seconds/100 cc or greater):

Water Resistance Test

A test piece of φ7 cm is cut from the laminate, immersed in room temperature water for 15 minutes, and then naturally dried at room temperature. The immersion and drying counts as one cycle, and the cycle is repeated 50 times on the test piece, resulting in a test piece after water resistance test. Then, the air resistance after water resistance test of the obtained test piece after water resistance test is measured.

INDUSTRIAL APPLICABILITY

The laminate of the present disclosure has low air permeability and excellent moisture permeability, and also has excellent moisture permeability in a low temperature and low humidity environment; as such, the laminate of the present disclosure can be particularly preferably used as a total heat exchange sheet. As such, the present disclosure has industrial applicability.

REFERENCE SIGNS LIST

1 Laminate
11 Porous substrate
11*a* One side of porous substrate
12 Moisture-permeable membrane

The invention claimed is:

1. A laminate comprising a porous substrate and a moisture-permeable membrane disposed on one side of the porous substrate, wherein the laminate has an air resistance of 3000 seconds/100 cc or greater based on a Gurley method according to JIS P8117-2009, and a first moisture permeability of 300 g/($m^2$·24 h) or greater based on a moisture permeability testing method (a cup method) according to JIS Z0208-1976 under conditions of a temperature of 5° C., a relative humidity of 45%, and a wind speed of 0.2 m/s or less, wherein the moisture-permeable membrane comprises a resin with hydrophilic groups having cationic and anionic groups, and hydrophobic groups, wherein the hydrophilic groups comprise phosphorylcholine groups, wherein the porous substrate comprises a polyolefin-based resin, wherein the resin of the moisture-permeable membrane is a copolymer containing a constituent unit of Formula (2) below, wherein the constituent unit of Formula (2) comprises the hydrophobic groups, wherein the resin comprises a hydrophilic portion from said hydrophilic groups and a hydrophobic portion from said hydrophobic groups, and the hydrophilic portion and the hydrophobic portion are phase-separated, and wherein a thickness of the moisture-permeable membrane is from 50 to 500 nm:

(2)

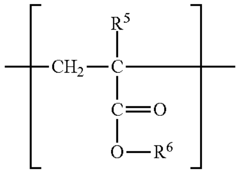

wherein in Formula (2), $R^5$ represents a hydrogen atom or an alkyl group having from 1 to 4 carbons, and $R^6$ represents a hydrocarbon group having 4 or more carbons.

2. The laminate according to claim 1, wherein with respect to the first moisture permeability and a second moisture permeability of the laminate, the second moisture permeability being based on a moisture permeability testing method (a cup method) according to JIS Z0208-1976 under conditions of a temperature of 20° C., a relative humidity of 65%, and a wind speed of 0.2 m/s or less, both a≥154 and b≥−170 are satisfied, where a linear function obtained by connecting two points of the first moisture permeability and the second moisture permeability is expressed by an equation of y=ax+b on a graph in which x is a volume absolute humidity and y is a moisture permeability under the measurement conditions of the moisture permeabilities.

* * * * *